United States Patent
Balzer

(10) Patent No.: US 10,480,323 B2
(45) Date of Patent: Nov. 19, 2019

(54) GAS TURBINE ENGINE TURBINE BLADE AIRFOIL PROFILE

(71) Applicant: United Technologies Corporation, Farmington, CT (US)

(72) Inventor: Wolfgang Balzer, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 23 days.

(21) Appl. No.: 14/993,528

(22) Filed: Jan. 12, 2016

(65) Prior Publication Data

US 2017/0198586 A1    Jul. 13, 2017

(51) Int. Cl.
  *F02C 3/04* (2006.01)
  *F01D 5/14* (2006.01)

(52) U.S. Cl.
  CPC .......... *F01D 5/141* (2013.01); *F05D 2250/74* (2013.01)

(58) Field of Classification Search
  CPC .............................. F01D 5/141; F05D 2250/74
  See application file for complete search history.

(56) References Cited

U.S. PATENT DOCUMENTS

| | | | |
|---|---|---|---|
| 5,980,209 A | 11/1999 | Barry et al. | |
| 6,358,012 B1 | 3/2002 | Staubach | |
| 6,450,770 B1 | 9/2002 | Wang et al. | |
| 6,461,110 B1 | 10/2002 | By et al. | |
| 6,474,948 B1 | 11/2002 | Pirolla et al. | |
| 6,503,054 B1 | 1/2003 | Bielek et al. | |
| 6,503,059 B1 | 1/2003 | Frost et al. | |
| 6,558,122 B1 | 5/2003 | Xu et al. | |
| 6,579,066 B1 | 6/2003 | Saito et al. | |
| 6,685,434 B1 | 2/2004 | Humanchuk et al. | |
| 6,715,990 B1 | 4/2004 | Arness et al. | |
| 6,722,852 B1 | 4/2004 | Wedlake et al. | |
| 6,739,838 B1 | 5/2004 | Bielek et al. | |
| 6,739,839 B1 | 5/2004 | Brown et al. | |
| 6,769,878 B1 | 8/2004 | Parker et al. | |
| 6,769,879 B1 | 8/2004 | Cleveland et al. | |
| 6,779,977 B2 | 8/2004 | Lagrange et al. | |
| 6,779,980 B1 | 8/2004 | Brittingham et al. | |
| 6,808,368 B1 | 10/2004 | Tomberg et al. | |
| 6,832,897 B2 | 12/2004 | Urban | |
| 6,854,961 B2 | 2/2005 | Zhang et al. | |
| 6,857,855 B1 | 2/2005 | Snook et al. | |
| 6,881,038 B1 | 4/2005 | Beddard et al. | |
| 6,884,038 B2 | 4/2005 | Hyde et al. | |

(Continued)

FOREIGN PATENT DOCUMENTS

WO    2014007939    1/2014
WO    2015112222    7/2015

*Primary Examiner* — Jesse Bogue
(74) *Attorney, Agent, or Firm* — Carlson, Gaskey & Olds, P.C.

(57) ABSTRACT

A turbine blade for a gas turbine engine according to an example of the present disclosure includes, among other things, an airfoil including leading and trailing edges joined by spaced apart pressure and suction sides to provide an exterior airfoil surface extending from a platform in a radial direction to a tip. The external airfoil surface is formed in substantial conformance with multiple cross-sectional profiles of the airfoil described by a set of Cartesian coordinates.

20 Claims, 4 Drawing Sheets

(56) References Cited

U.S. PATENT DOCUMENTS

| | | |
|---|---|---|
| 6,910,868 B2 | 6/2005 | Hyde et al. |
| 6,932,577 B2 | 8/2005 | Strohl et al. |
| 7,306,436 B2 | 12/2007 | Girgis et al. |
| 7,354,249 B2 | 4/2008 | Girgis et al. |
| 7,537,433 B2 | 5/2009 | Girgis et al. |
| 7,581,930 B2 | 9/2009 | Aggarwala et al. |
| 7,632,075 B2 | 12/2009 | Liang et al. |
| 7,648,340 B2 | 1/2010 | Sadler et al. |
| 7,976,280 B2 | 7/2011 | Brittingham et al. |
| 9,115,588 B2 * | 8/2015 | Nash ................. F01D 5/141 |
| 9,133,713 B2 * | 9/2015 | Allen-Bradley ........ F01D 5/141 |
| 2003/0017052 A1 | 1/2003 | Frost et al. |
| 2003/0021680 A1 | 1/2003 | Bielek et al. |
| 2004/0057833 A1 | 3/2004 | Arness et al. |
| 2004/0115058 A1 | 6/2004 | Lagrange et al. |
| 2004/0223849 A1 | 11/2004 | Urban |
| 2004/0241002 A1 | 12/2004 | Zhang et al. |
| 2005/0013695 A1 | 1/2005 | Hyde et al. |
| 2005/0019160 A1 | 1/2005 | Hyde et al. |
| 2005/0031453 A1 | 2/2005 | Snook et al. |
| 2005/0079061 A1 | 4/2005 | Beddard et al. |
| 2005/0111978 A1 | 5/2005 | Strohl et al. |
| 2007/0183895 A1 | 8/2007 | Sheffield |
| 2007/0183896 A1 | 8/2007 | Jay et al. |
| 2007/0183897 A1 | 8/2007 | Sadler et al. |
| 2007/0207035 A1 | 9/2007 | Girgis et al. |
| 2008/0044287 A1 | 2/2008 | Girgis et al. |
| 2008/0056896 A1* | 3/2008 | Trindade ................. F01D 5/141 415/208.1 |
| 2008/0056902 A1 | 3/2008 | Ravanis et al. |
| 2008/0056903 A1 | 3/2008 | Girgis et al. |
| 2008/0063530 A1 | 3/2008 | Papple et al. |
| 2008/0063531 A1 | 3/2008 | Sreekanth et al. |
| 2008/0101959 A1 | 5/2008 | McRae et al. |
| 2008/0273984 A1 | 11/2008 | Liang et al. |
| 2009/0162204 A1 | 6/2009 | Aggarwala et al. |
| 2010/0329874 A1 | 12/2010 | Tsifourdaris |
| 2013/0136611 A1* | 5/2013 | Gustafson ............... F01D 5/141 416/223 A |
| 2014/0311149 A1* | 10/2014 | Chuang ................. F04D 29/384 60/726 |
| 2016/0115795 A1* | 4/2016 | Munoz .................... F01D 5/141 416/223 A |
| 2016/0281509 A1* | 9/2016 | Pons ....................... F01D 5/141 |
| 2016/0298470 A1* | 10/2016 | Fukuda .................. F01D 5/141 |

* cited by examiner

GAS TURBINE ENGINE TURBINE BLADE AIRFOIL PROFILE

BACKGROUND

This disclosure relates to a gas turbine engine, and more particularly to an airfoil that may be incorporated into a gas turbine engine.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

In turbine blade design, there is an emphasis on stress-resistant airfoil and platform designs, with reduced losses, increased lift and turning efficiency, and improved turbine performance and service life. To achieve these results, non-linear flow analyses and complex strain modeling are required, making practical results difficult to predict. Blade loading considerations also impose substantial design limitations, which cannot easily be generalized from one system to another.

SUMMARY

A turbine blade for a gas turbine engine according to an example of the present disclosure includes an airfoil including leading and trailing edges joined by spaced apart pressure and suction sides to provide an exterior airfoil surface extending from a platform in a radial direction to a tip. The external airfoil surface is formed in substantial conformance with multiple cross-sectional profiles of the airfoil described by a set of Cartesian coordinates set forth in Table 1. The Cartesian coordinates provide an axial coordinate scaled by a local axial chord, a circumferential coordinate scaled by a local axial chord, and a span location. The local axial chord corresponds to a width of the airfoil between the leading and trailing edges at the span location.

In a further embodiment of any of the foregoing embodiments, the airfoil is a second stage turbine blade.

In a further embodiment of any of the foregoing embodiments, the span location corresponds to a distance from a rotational axis of the airfoil.

In a further embodiment of any of the foregoing embodiments, the Cartesian coordinates in Table 1 have a tolerance relative to the specified coordinates of ±0.030 inches (±0.762 mm).

A turbine section for a gas turbine engine according to an example of the present disclosure includes a high pressure turbine configured to drive a compressor section, and a low pressure turbine configured to drive a fan section. The high pressure turbine includes an array of turbine blades, wherein at least one turbine blade includes an airfoil having leading and trailing edges joined by spaced apart pressure and suction sides to provide an exterior airfoil surface extending from a platform in a radial direction to a tip. The external airfoil surface is formed in substantial conformance with multiple cross-sectional profiles of the airfoil described by a set of Cartesian coordinates set forth in Table 1. The Cartesian coordinates provided by an axial coordinate scaled by a local axial chord, a circumferential coordinate scaled by a local axial chord, and a span location. The local axial chord corresponds to a width of the airfoil between the leading and trailing edges at the span location.

In a further embodiment of any of the foregoing embodiments, the array is a second stage array of turbine blades.

In a further embodiment of any of the foregoing embodiments, the high pressure turbine includes an array of fixed stator vanes upstream from the first stage array of turbine blades.

In a further embodiment of any of the foregoing embodiments, the second stage array of turbine blades includes forty-four turbine blades.

In a further embodiment of any of the foregoing embodiments, the span location corresponds to a distance from a rotational axis of the airfoil.

In a further embodiment of any of the foregoing embodiments, the Cartesian coordinates in Table 1 have a tolerance relative to the specified coordinates of ±0.030 inches (±0.762 mm).

In a further embodiment of any of the foregoing embodiments, the high pressure turbine includes two arrays of turbine blades and two arrays of fixed stator vanes.

A gas turbine engine according to an example of the present disclosure includes a compressor section, a combustor fluidly connected to the compressor section, and a turbine section fluidly connected to the combustor. The turbine section comprises a high pressure turbine coupled to the compressor section via a shaft, and a low pressure turbine aft of the high pressure turbine. The high pressure turbine includes an array of turbine blades. At least one turbine blade includes an airfoil having leading and trailing edges joined by spaced apart pressure and suction sides to provide an exterior airfoil surface extending from a platform in a radial direction to a tip. The external airfoil surface is formed in substantial conformance with multiple cross-sectional profiles of the airfoil described by a set of Cartesian coordinates set forth in Table 1. The Cartesian coordinates provided by an axial coordinate scaled by a local axial chord, a circumferential coordinate scaled by a local axial chord, and a span location. The local axial chord corresponds to a width of the airfoil between the leading and trailing edges at the span location.

In a further embodiment of any of the foregoing embodiments, the array is a second stage array of turbine blades.

In a further embodiment of any of the foregoing embodiments, the high pressure turbine includes an array of fixed stator vanes upstream from the first stage array of turbine blades.

In a further embodiment of any of the foregoing embodiments, the second stage array of turbine blades includes forty-four turbine blades.

In a further embodiment of any of the foregoing embodiments, the span location corresponds to a distance from a rotational axis of the airfoil.

In a further embodiment of any of the foregoing embodiments, the Cartesian coordinates in Table 1 have a tolerance relative to the specified coordinates of ±0.030 inches (±0.762 mm).

In a further embodiment of any of the foregoing embodiments, the high pressure turbine includes two arrays of turbine blades and two arrays of fixed stator vanes.

In a further embodiment of any of the foregoing embodiments, the low pressure turbine includes between three and six stages of turbine blades.

A further embodiment of any of the foregoing embodiments includes a fan section including a plurality of fan blades. A geared architecture is configured to cause the fan section to rotate at a lower speed than the low pressure turbine.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

Figure 1:
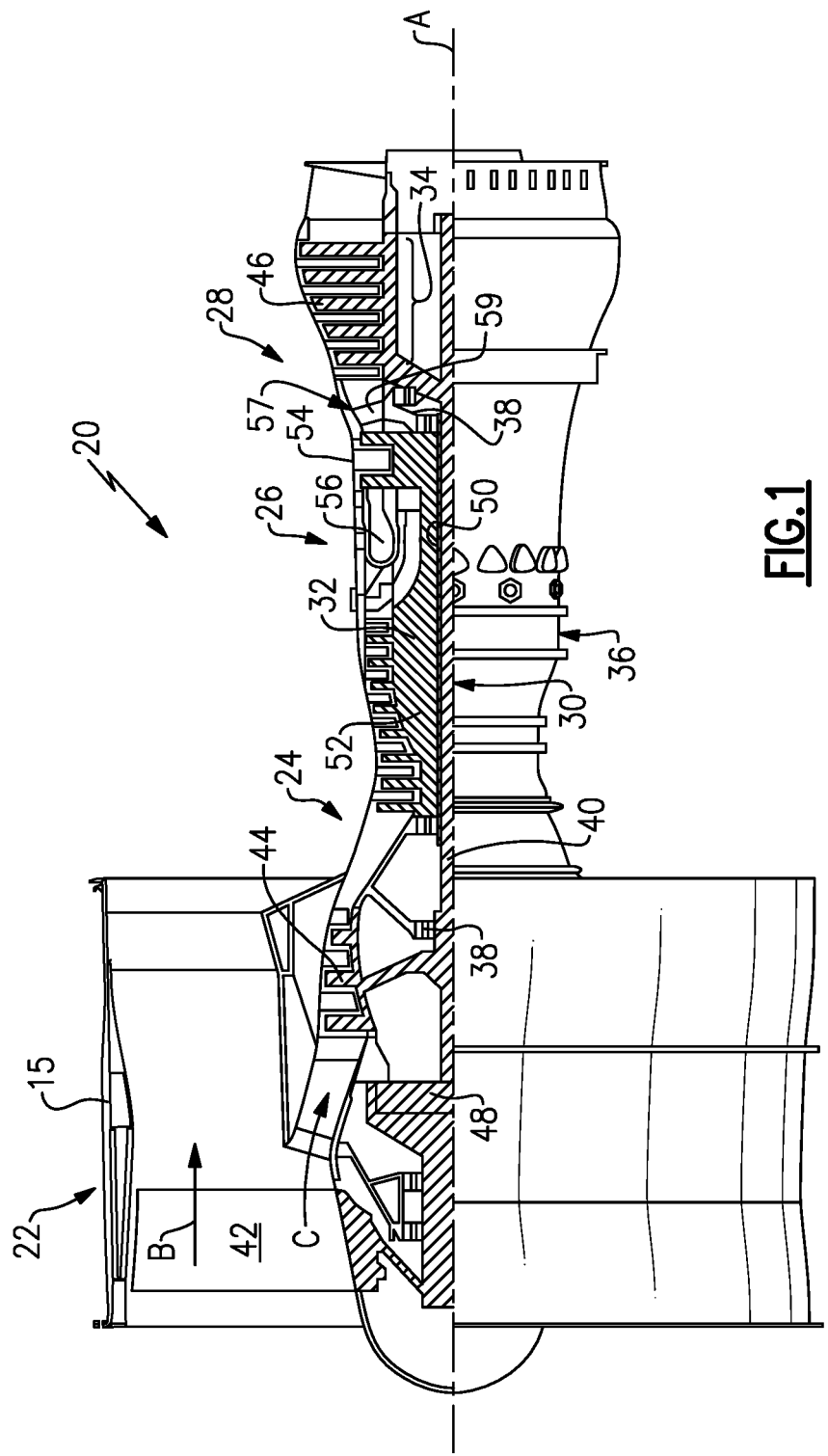
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than or equal to about 1.50, or more narrowly less than about 1.45. "Low corrected fan tip speed" is the actual fan tip speed in ft/sec divided by an industry standard temperature correction of [(Tram ° R)/(518.7° R)]^-0.5. The "Low corrected fan tip speed" as disclosed herein according to one non-limiting embodiment is less than about 1150 ft/second.

In some embodiments, the fan section 22 includes 26 or fewer fan blades 42, or more narrowly 20 or fewer fan blades 42. In embodiments, the low pressure turbine 46 includes no more than about 6 turbine rotors or stages, schematically indicated at 34. In further embodiments, the low pressure turbine 46 includes between 3 and 6 turbine rotors. In some embodiments, a ratio between the number of fan blades 42 and the number of low pressure turbine rotors 34 is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
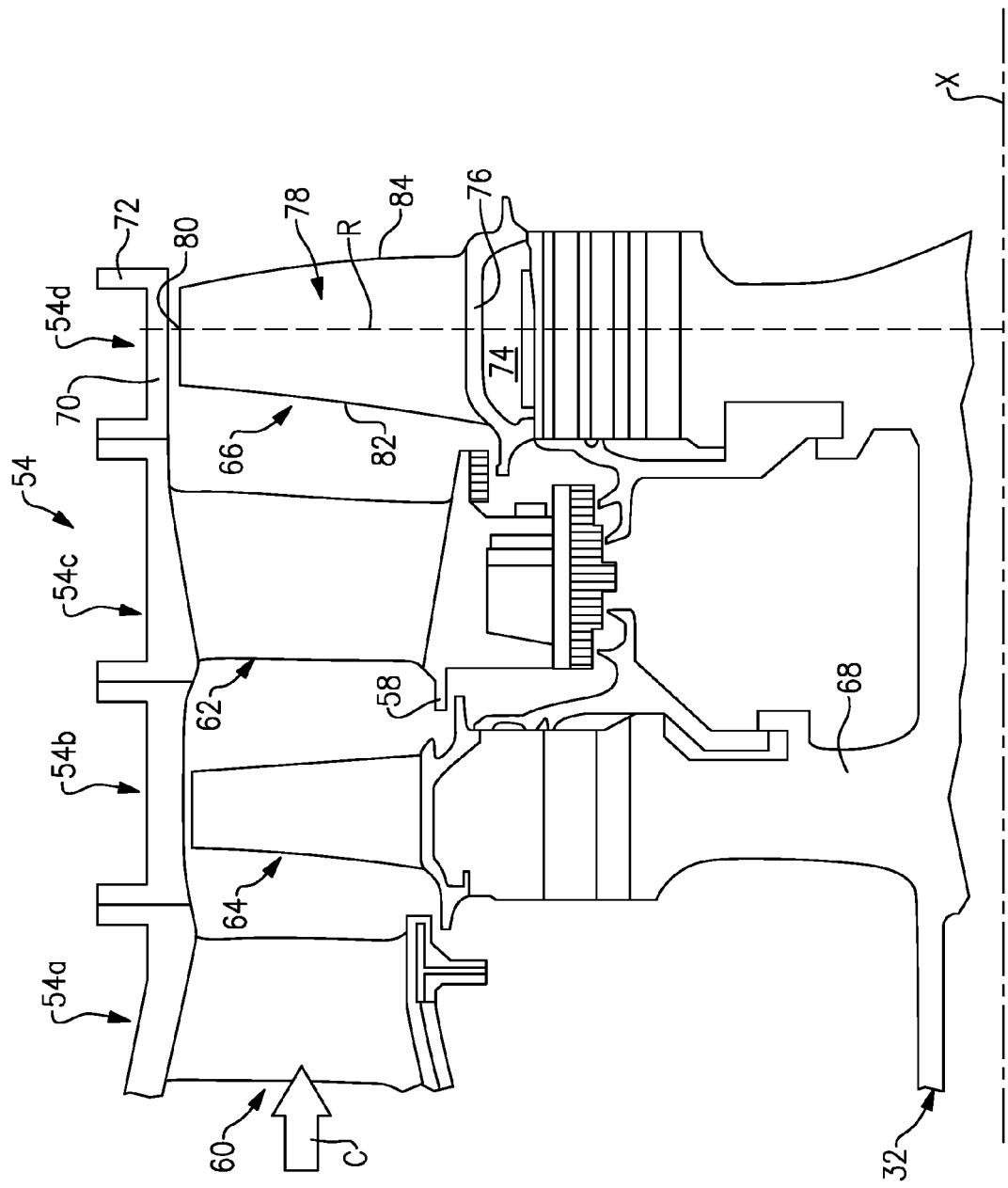
FIG. 2 is a cross-sectional view through a high pressure turbine section.

Referring to FIG. 2, a cross-sectional view through a high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64 is arranged axially between the first and second fixed vane arrays 54a, 54c. A second stage array 54d of circumferentially spaced turbine blades 66 is arranged aft of the second array 54c of fixed vanes 62. The first and second stage arrays 54b, 54d are arranged within a core flow path C and are operatively connected to a spool 32.

A root 74 of each turbine blade 66 is mounted to the rotor disk 68. The turbine blade 66 includes a platform 76, which provides the inner flow path, supported by the root 74. An airfoil 78 extending in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal 70 mounted to a turbine case 72. A platform 58 of the second fixed vane array 62 is arranged in an overlapping relationship with the turbine blades 64, 66.

Figure 3A:
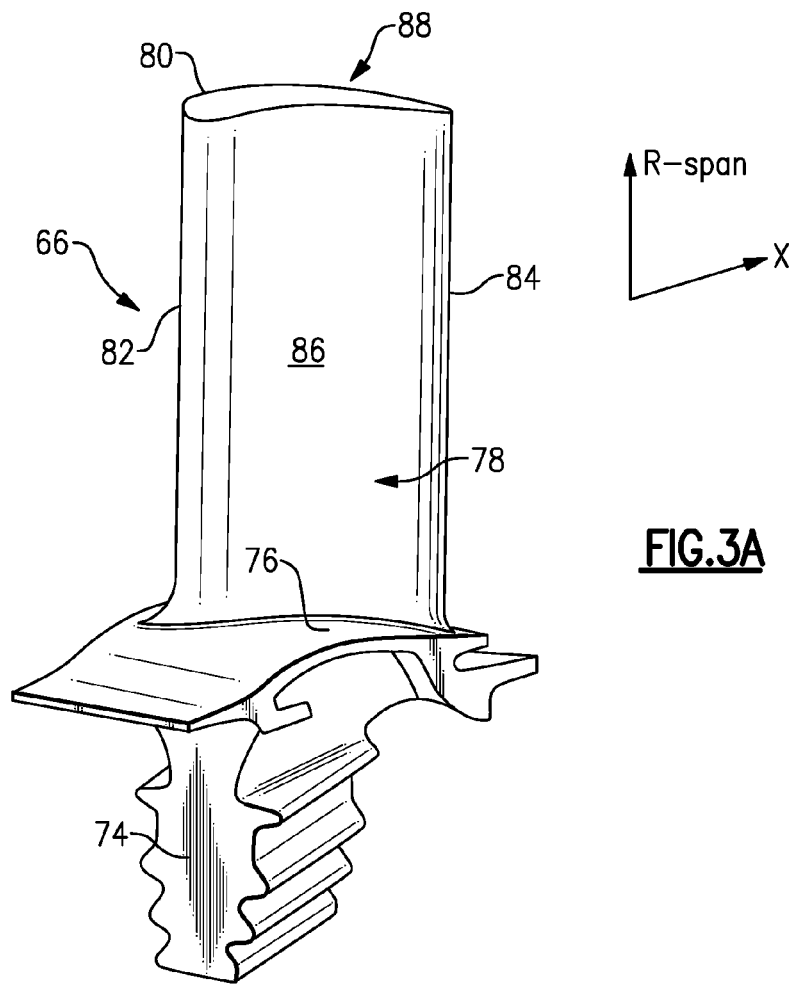
FIG. 3A is a perspective view of an airfoil.
Figure 3B:
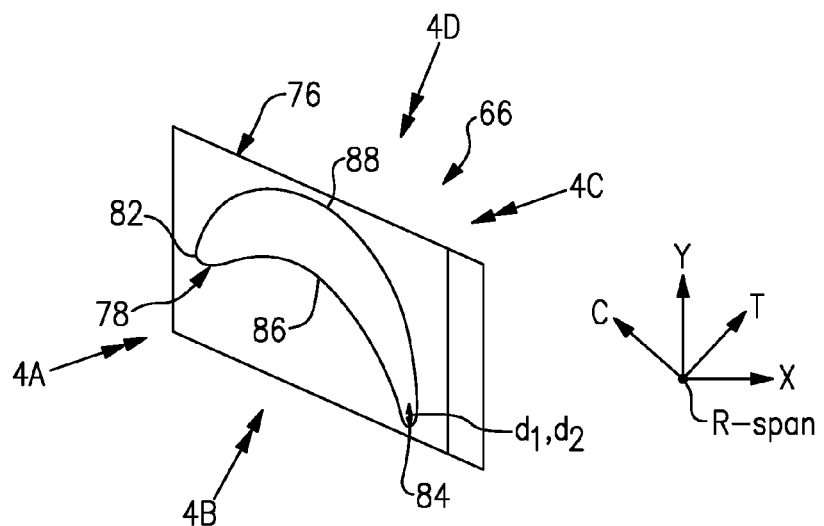
FIG. 3B is a plan view of the airfoil illustrating directional references.
Figure 4:
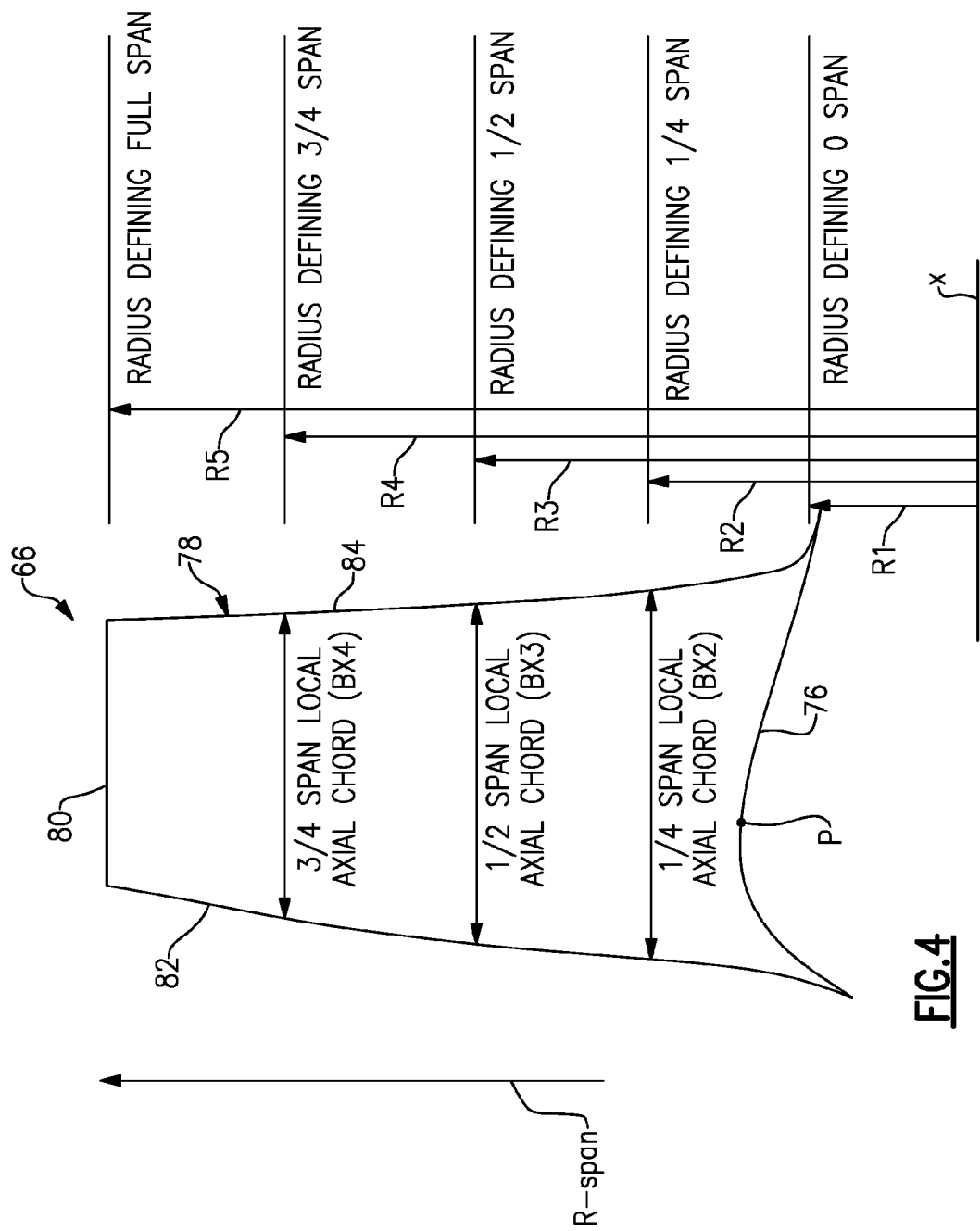
FIG. 4 depict the span positions and local axial chords referenced in Table 1.

Referring to FIGS. 3A and 3B, the airfoil 78 somewhat schematically illustrates exterior airfoil surface extending in a chord-wise direction C from a leading edge 82 to a trailing edge 84. The airfoil 78 is provided between pressure and suction sides 86, 88 in an airfoil thickness direction T, which is generally perpendicular to the chord-wise direction C. Multiple turbine blades 66 are arranged circumferentially in a circumferential direction Y. The airfoil 78 extends from the platform 76 in the radial direction R, or spanwise, to the tip 80. The exterior airfoil surface may include multiple film cooling holes (not shown). In some embodiments, a ratio of a first radius d1 defining a first contour of the trailing edge 84 at 0% span and a second radius d2 defining a second contour of the trailing edge 84 at 100% span is greater than or equal to about 0.6, or more narrowly greater than or equal to about 0.65. The radii d1, d2 define a radius of curvature of the surface contour of the trailing edge 84 taken generally in the x-y plane. For the purposes of this disclosure, the term about means ±3 percent unless otherwise disclosed.

The exterior surface of the airfoil 78 generates lift based upon its geometry and direct flow along the core flow path C. In one example, the second stage array 54d consists of forty-four (44) turbine blades 66, but the number may vary according to engine size. The turbine blades 66 can be constructed from a high strength, heat resistant material such as a nickel-based or cobalt-based superalloy, or of a high temperature, stress resistant ceramic or composite material, for example. In cooled configurations, internal fluid passages and external cooling apertures provide for a combination of impingement and film cooling. In addition, one or more thermal barrier coatings (TBC), abrasion-resistant coatings, and/or other protective coatings may be applied to the turbine blade 66.

The geometries of external surfaces of airfoil 78 are described in terms of Cartesian coordinates defined along x, y and z axes, which respectively correspond to the axial (x), circumferential (y) and radial (R-span) directions shown in FIGS. 3A and 3B. The span coordinate is provided as a radial distance (R1-R4 in FIG. 5) from the rotational axis X of the airfoil 78. The "0" span is taken at a point P where the airfoil 78 meets the platform 76, as schematically illustrated in FIG. 5. The overall or full span is 100% the distance from the point P to the tip 80 in the radial direction R-span. By way of example, the "¼ span" is 25% the distance from the point P toward the tip 80 in the radial direction R-span. In one example, R1 is between 6.4-6.6 inches (16.2-16.8 cm), R2 is 6.8-7.0 inches (17.3-17.8 cm), R3 is 7.3-7.5 inches (18.5-19.1 cm), R4 is 7.9-8.1 inches (20.0-20.6 cm), and R5 is 8.3-8.5 inches (21.0-21.6 cm). In the example, the overall span of the airfoil 78 relative to point P is 1.85-1.95 inches (4.7-5.0 cm). The radii R1-R5 can be converted to metric (cm) by multiplying by 2.54.

The axial (x) and circumferential (y) coordinates are normalized by the local axial chord (Bx) for the give span location (Bx1-Bx4), as shown in FIG. 5. By way of example, local axial chord (Bx2) for axial (x) and circumferential (y) coordinates associated with the ¼ span corresponds to the width of the airfoil 78 between the leading and trailing edges 82, 84 at the ¼ span location.

The contour of the airfoil 78 is set forth in Table 1, which provides the axial (x) and circumferential (y) coordinates (in inches) for given span locations or positions. The axial and circumferential coordinates (x, y) can be converted to metric (mm) by multiplying by 25.4. Three dimensional airfoil surfaces are formed by joining adjacent points in Table 1 in a smooth manner and joining adjacent sections or sectional profiles along the span. The manufacturing tolerance relative to the specified coordinates is ±0.010 inches (±0.254 mm). In other embodiments, the manufacturing tolerance relative to the specified coordinates is ±0.030 inches (±0.762 mm). The coordinates define points on a cold, uncoated, stationary airfoil surface, in a plane at the corresponding span positions. Additional elements such as cooling holes, protective coatings, fillets and seal structures may also be formed onto the specified airfoil surface, or onto an adjacent platform surface, but these elements are not necessarily described by the normalized coordinates. For example, a variable coating may be applied between 0.0001 inches (0.003 mm) (trace) and 0.010 inches (0.25 mm) thick. Although the example radii R1-R5 and coordinates are given herein as absolute values, in some embodiments, the radii and coordinates are scaled by a predetermined factor corresponding to the turbine section 28.

TABLE 1

| REFERENCE RADIUS: R1 SECTION COORDINATES (X, Y)/BX1 | |
|---|---|
| 0.000 | 0.000 |
| −0.001 | 0.002 |

TABLE 1-continued

| | |
|---|---|
| −0.002 | 0.003 |
| −0.004 | 0.006 |
| −0.006 | 0.009 |
| −0.009 | 0.014 |
| −0.011 | 0.021 |
| −0.013 | 0.031 |
| −0.014 | 0.044 |
| −0.012 | 0.059 |
| −0.009 | 0.077 |
| −0.004 | 0.099 |
| 0.003 | 0.123 |
| 0.013 | 0.149 |
| 0.026 | 0.178 |
| 0.043 | 0.209 |
| 0.064 | 0.241 |
| 0.092 | 0.272 |
| 0.125 | 0.301 |
| 0.166 | 0.326 |
| 0.212 | 0.344 |
| 0.260 | 0.353 |
| 0.311 | 0.354 |
| 0.361 | 0.348 |
| 0.410 | 0.334 |
| 0.457 | 0.313 |
| 0.500 | 0.288 |
| 0.541 | 0.259 |
| 0.579 | 0.226 |
| 0.614 | 0.190 |
| 0.646 | 0.151 |
| 0.675 | 0.111 |
| 0.703 | 0.069 |
| 0.729 | 0.027 |
| 0.754 | −0.016 |
| 0.779 | −0.058 |
| 0.802 | −0.100 |
| 0.826 | −0.142 |
| 0.847 | −0.183 |
| 0.867 | −0.221 |
| 0.886 | −0.257 |
| 0.904 | −0.291 |
| 0.919 | −0.323 |
| 0.933 | −0.351 |
| 0.945 | −0.377 |
| 0.955 | −0.399 |
| 0.964 | −0.419 |
| 0.971 | −0.436 |
| 0.977 | −0.450 |
| 0.982 | −0.461 |
| 0.985 | −0.469 |
| 0.986 | −0.476 |
| 0.984 | −0.482 |
| 0.983 | −0.485 |
| 0.980 | −0.487 |
| 0.979 | −0.489 |
| 0.977 | −0.490 |
| 0.976 | −0.490 |
| 0.975 | −0.491 |
| 0.973 | −0.491 |
| 0.970 | −0.492 |
| 0.966 | −0.492 |
| 0.962 | −0.490 |
| 0.956 | −0.486 |
| 0.951 | −0.480 |
| 0.945 | −0.472 |
| 0.938 | −0.462 |
| 0.928 | −0.450 |
| 0.918 | −0.437 |
| 0.905 | −0.422 |
| 0.891 | −0.406 |
| 0.876 | −0.388 |
| 0.858 | −0.369 |
| 0.838 | −0.349 |
| 0.817 | −0.329 |
| 0.794 | −0.308 |
| 0.769 | −0.287 |
| 0.744 | −0.266 |
| 0.717 | −0.246 |
| 0.689 | −0.227 |
| 0.661 | −0.209 |
| 0.632 | −0.192 |

TABLE 1-continued

| | |
|---|---|
| 0.602 | −0.175 |
| 0.573 | −0.160 |
| 0.542 | −0.146 |
| 0.511 | −0.132 |
| 0.480 | −0.120 |
| 0.449 | −0.108 |
| 0.417 | −0.097 |
| 0.385 | −0.087 |
| 0.353 | −0.078 |
| 0.320 | −0.070 |
| 0.288 | −0.063 |
| 0.257 | −0.056 |
| 0.226 | −0.050 |
| 0.197 | −0.045 |
| 0.169 | −0.040 |
| 0.144 | −0.037 |
| 0.120 | −0.034 |
| 0.099 | −0.031 |
| 0.080 | −0.029 |
| 0.064 | −0.027 |
| 0.049 | −0.026 |
| 0.036 | −0.024 |
| 0.025 | −0.020 |
| 0.017 | −0.015 |
| 0.012 | −0.012 |
| 0.008 | −0.008 |
| 0.005 | −0.006 |
| 0.003 | −0.004 |
| 0.002 | −0.002 |
| 0.001 | −0.001 |

REFERENCE RADIUS: R2
SECTION COORDINATES (X, Y)/BX2

| | |
|---|---|
| 0.000 | 0.000 |
| −0.001 | 0.002 |
| −0.002 | 0.003 |
| −0.003 | 0.006 |
| −0.004 | 0.010 |
| −0.005 | 0.015 |
| −0.007 | 0.021 |
| −0.008 | 0.030 |
| −0.007 | 0.042 |
| −0.004 | 0.058 |
| 0.004 | 0.074 |
| 0.016 | 0.092 |
| 0.030 | 0.111 |
| 0.047 | 0.131 |
| 0.068 | 0.152 |
| 0.093 | 0.174 |
| 0.124 | 0.194 |
| 0.160 | 0.212 |
| 0.199 | 0.225 |
| 0.243 | 0.232 |
| 0.289 | 0.233 |
| 0.335 | 0.227 |
| 0.381 | 0.215 |
| 0.426 | 0.197 |
| 0.467 | 0.175 |
| 0.507 | 0.148 |
| 0.544 | 0.118 |
| 0.578 | 0.086 |
| 0.610 | 0.051 |
| 0.639 | 0.014 |
| 0.667 | −0.023 |
| 0.694 | −0.061 |
| 0.720 | −0.100 |
| 0.746 | −0.139 |
| 0.770 | −0.179 |
| 0.794 | −0.219 |
| 0.817 | −0.258 |
| 0.838 | −0.297 |
| 0.859 | −0.336 |
| 0.878 | −0.371 |
| 0.896 | −0.406 |
| 0.913 | −0.437 |
| 0.929 | −0.466 |
| 0.942 | −0.493 |
| 0.954 | −0.516 |
| 0.965 | −0.538 |
| 0.973 | −0.556 |

TABLE 1-continued

| | |
|---|---|
| 0.980 | −0.572 |
| 0.986 | −0.585 |
| 0.989 | −0.596 |
| 0.992 | −0.603 |
| 0.992 | −0.610 |
| 0.991 | −0.615 |
| 0.989 | −0.618 |
| 0.986 | −0.621 |
| 0.985 | −0.622 |
| 0.983 | −0.622 |
| 0.982 | −0.623 |
| 0.981 | −0.623 |
| 0.978 | −0.624 |
| 0.976 | −0.624 |
| 0.972 | −0.624 |
| 0.967 | −0.622 |
| 0.962 | −0.618 |
| 0.957 | −0.611 |
| 0.950 | −0.602 |
| 0.942 | −0.592 |
| 0.933 | −0.580 |
| 0.921 | −0.566 |
| 0.908 | −0.551 |
| 0.893 | −0.534 |
| 0.876 | −0.516 |
| 0.857 | −0.497 |
| 0.836 | −0.476 |
| 0.813 | −0.455 |
| 0.788 | −0.433 |
| 0.762 | −0.411 |
| 0.736 | −0.389 |
| 0.708 | −0.367 |
| 0.680 | −0.345 |
| 0.652 | −0.324 |
| 0.623 | −0.304 |
| 0.594 | −0.283 |
| 0.564 | −0.264 |
| 0.535 | −0.245 |
| 0.504 | −0.226 |
| 0.474 | −0.208 |
| 0.444 | −0.190 |
| 0.413 | −0.173 |
| 0.381 | −0.156 |
| 0.350 | −0.141 |
| 0.318 | −0.125 |
| 0.287 | −0.111 |
| 0.256 | −0.098 |
| 0.225 | −0.086 |
| 0.196 | −0.075 |
| 0.169 | −0.066 |
| 0.143 | −0.059 |
| 0.119 | −0.052 |
| 0.097 | −0.048 |
| 0.078 | −0.044 |
| 0.060 | −0.042 |
| 0.044 | −0.038 |
| 0.031 | −0.032 |
| 0.021 | −0.026 |
| 0.014 | −0.019 |
| 0.009 | −0.014 |
| 0.006 | −0.010 |
| 0.004 | −0.007 |
| 0.003 | −0.005 |
| 0.001 | −0.002 |
| 0.001 | −0.001 |
| REFERENCE RADIUS: R3 SECTION COORDINATES (X, Y)/BX3 | |
| 0.000 | 0.000 |
| 0.000 | 0.002 |
| −0.001 | 0.004 |
| −0.001 | 0.007 |
| −0.002 | 0.011 |
| −0.002 | 0.016 |
| −0.001 | 0.023 |
| 0.000 | 0.032 |
| 0.004 | 0.043 |
| 0.012 | 0.057 |
| 0.024 | 0.071 |
| 0.039 | 0.085 |
| 0.058 | 0.100 |
| 0.081 | 0.115 |
| 0.108 | 0.128 |
| 0.140 | 0.139 |
| 0.177 | 0.146 |
| 0.217 | 0.148 |
| 0.259 | 0.143 |
| 0.302 | 0.133 |
| 0.345 | 0.117 |
| 0.387 | 0.096 |
| 0.427 | 0.071 |
| 0.465 | 0.043 |
| 0.501 | 0.012 |
| 0.534 | −0.022 |
| 0.565 | −0.057 |
| 0.594 | −0.094 |
| 0.622 | −0.131 |
| 0.650 | −0.169 |
| 0.676 | −0.208 |
| 0.702 | −0.246 |
| 0.727 | −0.285 |
| 0.752 | −0.325 |
| 0.777 | −0.364 |
| 0.801 | −0.404 |
| 0.824 | −0.443 |
| 0.846 | −0.482 |
| 0.868 | −0.520 |
| 0.887 | −0.556 |
| 0.905 | −0.590 |
| 0.922 | −0.622 |
| 0.937 | −0.651 |
| 0.950 | −0.678 |
| 0.961 | −0.702 |
| 0.971 | −0.723 |
| 0.979 | −0.742 |
| 0.986 | −0.758 |
| 0.991 | −0.771 |
| 0.996 | −0.781 |
| 0.998 | −0.789 |
| 0.998 | −0.796 |
| 0.996 | −0.801 |
| 0.995 | −0.804 |
| 0.992 | −0.806 |
| 0.991 | −0.807 |
| 0.989 | −0.808 |
| 0.988 | −0.809 |
| 0.987 | −0.809 |
| 0.984 | −0.810 |
| 0.981 | −0.810 |
| 0.977 | −0.810 |
| 0.971 | −0.808 |
| 0.966 | −0.803 |
| 0.960 | −0.795 |
| 0.953 | −0.786 |
| 0.944 | −0.775 |
| 0.934 | −0.762 |
| 0.921 | −0.748 |
| 0.907 | −0.731 |
| 0.891 | −0.713 |
| 0.872 | −0.693 |
| 0.852 | −0.672 |
| 0.829 | −0.648 |
| 0.806 | −0.625 |
| 0.780 | −0.600 |
| 0.753 | −0.574 |
| 0.726 | −0.549 |
| 0.698 | −0.522 |
| 0.669 | −0.497 |
| 0.640 | −0.471 |
| 0.611 | −0.446 |
| 0.582 | −0.421 |
| 0.553 | −0.396 |
| 0.523 | −0.372 |
| 0.493 | −0.348 |
| 0.463 | −0.324 |
| 0.432 | −0.300 |
| 0.402 | −0.277 |
| 0.371 | −0.254 |
| 0.340 | −0.231 |
| 0.309 | −0.209 |

TABLE 1-continued

| | |
|---|---|
| 0.279 | −0.188 |
| 0.248 | −0.167 |
| 0.218 | −0.147 |
| 0.190 | −0.129 |
| 0.163 | −0.113 |
| 0.137 | −0.098 |
| 0.114 | −0.085 |
| 0.093 | −0.073 |
| 0.073 | −0.064 |
| 0.056 | −0.056 |
| 0.041 | −0.049 |
| 0.027 | −0.041 |
| 0.017 | −0.032 |
| 0.011 | −0.024 |
| 0.007 | −0.018 |
| 0.004 | −0.013 |
| 0.003 | −0.008 |
| 0.002 | −0.006 |
| 0.001 | −0.003 |
| 0.000 | −0.001 |

REFERENCE RADIUS: R4
SECTION COORDINATES (X, Y)/BX4

| | |
|---|---|
| 0.000 | 0.000 |
| 0.000 | 0.002 |
| 0.000 | 0.004 |
| 0.000 | 0.008 |
| 0.000 | 0.012 |
| 0.001 | 0.018 |
| 0.004 | 0.026 |
| 0.008 | 0.035 |
| 0.016 | 0.046 |
| 0.027 | 0.059 |
| 0.043 | 0.071 |
| 0.064 | 0.083 |
| 0.091 | 0.090 |
| 0.122 | 0.092 |
| 0.156 | 0.088 |
| 0.192 | 0.078 |
| 0.229 | 0.062 |
| 0.267 | 0.040 |
| 0.303 | 0.013 |
| 0.340 | −0.018 |
| 0.376 | −0.054 |
| 0.408 | −0.091 |
| 0.439 | −0.132 |
| 0.469 | −0.174 |
| 0.497 | −0.217 |
| 0.525 | −0.260 |
| 0.552 | −0.303 |
| 0.579 | −0.346 |
| 0.605 | −0.389 |
| 0.632 | −0.433 |
| 0.658 | −0.476 |
| 0.684 | −0.520 |
| 0.710 | −0.564 |
| 0.735 | −0.608 |
| 0.761 | −0.652 |
| 0.786 | −0.697 |
| 0.810 | −0.740 |
| 0.834 | −0.783 |
| 0.857 | −0.825 |
| 0.878 | −0.864 |
| 0.898 | −0.901 |
| 0.916 | −0.936 |
| 0.932 | −0.968 |
| 0.947 | −0.997 |
| 0.959 | −1.023 |
| 0.970 | −1.046 |
| 0.980 | −1.066 |
| 0.987 | −1.083 |
| 0.993 | −1.097 |
| 0.998 | −1.109 |
| 1.000 | −1.118 |
| 0.999 | −1.125 |
| 0.997 | −1.131 |
| 0.994 | −1.134 |
| 0.992 | −1.136 |
| 0.990 | −1.137 |
| 0.989 | −1.138 |
| 0.987 | −1.139 |
| 0.986 | −1.140 |
| 0.982 | −1.140 |
| 0.979 | −1.141 |
| 0.974 | −1.140 |
| 0.967 | −1.138 |
| 0.961 | −1.132 |
| 0.955 | −1.124 |
| 0.946 | −1.113 |
| 0.936 | −1.100 |
| 0.924 | −1.085 |
| 0.909 | −1.067 |
| 0.893 | −1.047 |
| 0.875 | −1.025 |
| 0.854 | −1.000 |
| 0.832 | −0.974 |
| 0.808 | −0.945 |
| 0.783 | −0.915 |
| 0.755 | −0.883 |
| 0.727 | −0.849 |
| 0.699 | −0.816 |
| 0.669 | −0.781 |
| 0.640 | −0.747 |
| 0.610 | −0.713 |
| 0.581 | −0.678 |
| 0.551 | −0.644 |
| 0.522 | −0.610 |
| 0.492 | −0.576 |
| 0.463 | −0.541 |
| 0.433 | −0.507 |
| 0.403 | −0.473 |
| 0.374 | −0.439 |
| 0.344 | −0.405 |
| 0.314 | −0.371 |
| 0.284 | −0.337 |
| 0.256 | −0.304 |
| 0.227 | −0.272 |
| 0.199 | −0.240 |
| 0.173 | −0.211 |
| 0.148 | −0.183 |
| 0.125 | −0.157 |
| 0.104 | −0.133 |
| 0.084 | −0.112 |
| 0.067 | −0.093 |
| 0.052 | −0.077 |
| 0.039 | −0.062 |
| 0.028 | −0.050 |
| 0.018 | −0.040 |
| 0.010 | −0.031 |
| 0.006 | −0.023 |
| 0.003 | −0.016 |
| 0.002 | −0.011 |
| 0.001 | −0.007 |
| 0.000 | −0.004 |
| 0.000 | −0.002 |

In general, the turbine blade airfoil 78, as described herein, has a combination of axial sweep and tangential lean. Depending on configuration, the lean and sweep angles sometimes vary by up to ±10° or more. In addition, the turbine blade 78 is sometimes rotated with respect to a radial axis or a normal to the platform 76 or shroud surface adjacent to tip 80, for example by up to ±10° or more. Although blade 66 is depicted in FIG. 3A without a shroud, in alternative embodiments the blade 66 is provided with a shroud (not shown) adjacent to tip 80 which has a similar geometry as platform 76 to guide combustion products through the core flow path C.

Novel aspects of the turbine blade 66 and associated airfoil surfaces described herein are achieved by substantial conformance to specified geometries. Substantial conformance generally includes or may include a manufacturing tolerance of about ±0.010 inches (±0.254 mm), in order to account for variations in molding, cutting, shaping, surface finishing and other manufacturing processes, and to accommodate variability in coating thicknesses. This tolerance is generally constant or not scalable, and applies to each of the specified blade surfaces, regardless of size. In other embodiments, the manufacturing tolerance is about ±0.030 inches (±0.762 mm).

Substantial conformance is based on sets of points representing a three-dimensional surface with particular physical dimensions, for example in inches or millimeters, as determined by selecting particular values of the scaling parameters. A substantially conforming airfoil, blade or vane structure has surfaces that conform to the specified sets of points, within the specified tolerance.

Alternatively, substantial conformance is based on a determination by a national or international regulatory body, for example in a part certification or part manufacture approval (PMA) process for the Federal Aviation Administration, the European Aviation Safety Agency, the Civil Aviation Administration of China, the Japan Civil Aviation Bureau, or the Russian Federal Agency for Air Transport. In these configurations, substantial conformance encompasses a determination that a particular part or structure is identical to, or sufficiently similar to, the specified airfoil, blade or vane, or that the part or structure is sufficiently the same with respect to a part design in a type-certified or type-certificated airfoil, blade or vane, such that the part or structure complies with airworthiness standards applicable to the specified blade, vane or airfoil. In particular, substantial conformance encompasses any regulatory determination that a particular part or structure is sufficiently similar to, identical to, or the same as a specified blade, vane or airfoil, such that certification or authorization for use is based at least in part on the determination of similarity.

The contour of the airfoil 78 is set forth in Table 1, and variations according the embodiments described here, is defined according to desired aerodynamic performance and durability characteristics of the airfoil 78. The contours described herein may improve component life, producibility and manufacturing cost of the airfoil 78, for example.

Although an example embodiment has been disclosed, a worker of ordinary skill in this art would recognize that certain modifications would come within the scope of the claims. For that reason, the following claims should be studied to determine their true scope and content.

What is claimed is:

1. A turbine blade for a gas turbine engine comprising:
an airfoil including leading and trailing edges joined by spaced apart pressure and suction sides to provide an exterior airfoil surface extending from a platform in a radial direction to a tip; and
wherein the external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by a local axial chord, and a span location, wherein the local axial chord corresponds to a width of the airfoil between the leading and trailing edges at the span location.

2. The turbine blade according to claim 1, wherein the airfoil is a second stage turbine blade.

3. The turbine blade according to claim 1, wherein the span location corresponds to a distance from a rotational axis of the airfoil.

4. The turbine blade according to claim 1, wherein the Cartesian coordinates in Table 1 have a tolerance relative to the specified coordinates of ±0.030 inches (±0.762 mm).

5. A turbine section for a gas turbine engine comprising:
a high pressure turbine configured to drive a compressor section;
a low pressure turbine configured to drive a fan section;
wherein the high pressure turbine includes an array of turbine blades, wherein at least one turbine blade includes an airfoil having leading and trailing edges joined by spaced apart pressure and suction sides to provide an exterior airfoil surface extending from a platform in a radial direction to a tip; and
wherein the external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by a local axial chord, and a span location, wherein the local axial chord corresponds to a width of the airfoil between the leading and trailing edges at the span location.

6. The gas turbine engine according to claim 5, wherein the array is a second stage array of turbine blades.

7. The gas turbine engine according to claim 6, wherein the high pressure turbine includes an array of fixed stator vanes upstream from the first stage array of turbine blades.

8. The gas turbine engine according to claim 6, wherein the second stage array of turbine blades includes forty-four turbine blades.

9. The gas turbine engine according to claim 5, wherein the span location corresponds to a distance from a rotational axis of the airfoil.

10. The gas turbine engine according to claim 5, wherein the Cartesian coordinates in Table 1 have a tolerance relative to the specified coordinates of ±0.030 inches (±0.762 mm).

11. The gas turbine engine according to claim 5, wherein the high pressure turbine includes two arrays of turbine blades and two arrays of fixed stator vanes.

12. A gas turbine engine comprising:
a compressor section;
a combustor fluidly connected to the compressor section;
a turbine section fluidly connected to the combustor, the turbine section comprising a high pressure turbine coupled to the compressor section via a shaft, and a low pressure turbine aft of the high pressure turbine;
wherein the high pressure turbine includes an array of turbine blades, wherein at least one turbine blade includes an airfoil having leading and trailing edges joined by spaced apart pressure and suction sides to provide an exterior airfoil surface extending from a platform in a radial direction to a tip; and
wherein the external airfoil surface is formed in substantial conformance with multiple cross-sectional profiles of the airfoil described by a set of Cartesian coordinates set forth in Table 1, the Cartesian coordinates provided by an axial coordinate scaled by a local axial chord, a circumferential coordinate scaled by a local axial chord, and a span location, wherein the local axial chord corresponds to a width of the airfoil between the leading and trailing edges at the span location.

13. The gas turbine engine according to claim 12, wherein the array is a second stage array of turbine blades.

14. The gas turbine engine according to claim 13, wherein the high pressure turbine includes an array of fixed stator vanes upstream from the first stage array of turbine blades.

15. The gas turbine engine according to claim 13, wherein the second stage array of turbine blades includes forty-four turbine blades.

16. The gas turbine engine according to claim 12, wherein the span location corresponds to a distance from a rotational axis of the airfoil.

17. The gas turbine engine according to claim 12, wherein the Cartesian coordinates in Table 1 have a tolerance relative to the specified coordinates of ±0.030 inches (±0.762 mm).

18. The gas turbine engine according to claim 12, wherein the high pressure turbine includes two arrays of turbine blades and two arrays of fixed stator vanes.

19. The gas turbine engine according to claim 12, wherein the low pressure turbine includes between three and six stages of turbine blades.

20. The gas turbine engine according to claim 12, comprising:
   a fan section including a plurality of fan blades; and
   a geared architecture configured to cause the fan section to rotate at a lower speed than the low pressure turbine.

* * * * *